US011390471B2

(12) United States Patent
Hafvenstein

(10) Patent No.: US 11,390,471 B2
(45) Date of Patent: Jul. 19, 2022

(54) AGRICULTURAL PRODUCT DELIVERY APPLICATOR HAVING A HYDRAULIC CIRCUIT FOR CONTROLLING A METERING SYSTEM FOR THE PRODUCT

(71) Applicant: CNH Industrial America LLC, New Holland, PA (US)

(72) Inventor: David Hafvenstein, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 279 days.

(21) Appl. No.: 16/692,299

(22) Filed: Nov. 22, 2019

(65) Prior Publication Data

US 2021/0155419 A1   May 27, 2021

(51) Int. Cl.
| | |
|---|---|
| *B65G 53/14* | (2006.01) |
| *A01C 19/02* | (2006.01) |
| *A01C 15/04* | (2006.01) |
| *A01C 15/00* | (2006.01) |

(52) U.S. Cl.
CPC ............ *B65G 53/14* (2013.01); *A01C 15/005* (2013.01); *A01C 15/04* (2013.01); *A01C 19/02* (2013.01)

(58) Field of Classification Search
CPC ........ B65G 53/14; B65G 53/10; B65G 53/06; B65G 53/04; B65G 53/00; A01C 15/005; A01C 15/04; A01C 19/02; A01C 15/00; A01C 19/00

See application file for complete search history.

(56) References Cited

U.S. PATENT DOCUMENTS

| | | | |
|---|---|---|---|
| 7,380,733 | B2 | 6/2008 | Owenby et al. |
| 8,601,963 | B2 | 12/2013 | Friggstad |
| 8,701,576 | B2 | 4/2014 | Friggstad |
| 9,265,188 | B2 | 2/2016 | Thompson et al. |
| 9,622,402 | B2 | 4/2017 | Kinzenbaw et al. |
| 9,723,779 | B2 | 8/2017 | Wendte et al. |
| 9,907,224 | B2 | 3/2018 | Rosengren et al. |
| 10,028,427 | B2 | 7/2018 | Arnett et al. |
| 10,028,429 | B2 | 7/2018 | Roberge et al. |
| 10,058,021 | B2 | 8/2018 | Barsi et al. |
| 10,143,127 | B2 | 12/2018 | Wilhelmi et al. |
| 10,244,674 | B2 | 4/2019 | Kinzenbaw et al. |

(Continued)

FOREIGN PATENT DOCUMENTS

| | | | | |
|---|---|---|---|---|
| CN | 202068806 U | * | 12/2011 | ............... A01H 1/02 |
| WO | 2003079760 A1 | | 10/2003 | |

*Primary Examiner* — Christopher J. Novosad
(74) *Attorney, Agent, or Firm* — Rebecca L. Henkel; Rickard K. DeMille

(57) ABSTRACT

An agricultural product delivery applicator for delivering particulate product to a field. The applicator includes a bin having a first chamber to hold a first product, a second chamber to hold a second product, and a third chamber to hold a third product. The applicator further includes a pneumatic conveying system having an airflow source to provide an airflow, a delivery line operably connected to the airflow source and to the bin, and an outlet coupled to the delivery line. A metering system is operably connected between the supply compartment and the pneumatic conveying system. The metering system meters product with the airflow to result in a mixed flow of airflow and product. The metering system includes a novel hydraulic circuit for helping to meter the product.

17 Claims, 10 Drawing Sheets

(56) References Cited

U.S. PATENT DOCUMENTS

| | | |
|---|---|---|
| 10,296,017 B2 | 5/2019 | Schoeny et al. |
| 2004/0017281 A1 | 1/2004 | Dix |
| 2014/0261117 A1 | 9/2014 | Gray et al. |
| 2016/0095276 A1 | 4/2016 | Roberge et al. |
| 2018/0343792 A1 | 12/2018 | Roberge et al. |
| 2019/0021215 A1 | 1/2019 | Roberge et al. |
| 2019/0023504 A1 | 1/2019 | Roberge et al. |

* cited by examiner

AGRICULTURAL PRODUCT DELIVERY APPLICATOR HAVING A HYDRAULIC CIRCUIT FOR CONTROLLING A METERING SYSTEM FOR THE PRODUCT

FIELD OF THE INVENTION

The invention relates generally to an agricultural product delivery system for applying particulate material such as seed, fertilizer, herbicide, or insecticide to a field, and more particularly an agricultural product delivery applicator with an improved arrangement and control of hydraulic motors for metering product of a multiple-chamber product delivery system.

BACKGROUND OF THE INVENTION

Agricultural product delivery applicators (or systems) are known to utilize various mechanisms, including mechanical and pneumatic systems, to assist in the movement and delivery of particulate material or product. Example product that can be delivered include fertilizer, seed, insecticide, or herbicide. The product can move from a product bin through an interior passage provided by a series of elongate tubes, which extend from the product supply chamber to a product applicator. The applicator places the product on or in growing medium, such as soil. Such agricultural product delivery systems are commonly employed in planters, air drills, fertilizer and pesticide applicators, and a variety of other agricultural implements.

Agricultural application implements that employ an agricultural product delivery applicator are known to have the product supply bin associated with a metering system. The product is metered from the bin into a set of distribution channels for application to the soil. A pneumatic source, such as a fan or blower, provides air to convey and distribute material through the distribution channels.

The bin may comprise of a plurality of chambers (e.g., four chambers) and the metering system may comprise multiple sets of metering devises (e.g., four sets), each having a metering wheel (e.g., five metering wheels for each set of metering devices). For one example, a largest chamber uses a set of five-by-twenty inch metering wheels to control the application rate of a first product; a second largest chamber uses a set of five-by-twelve inch metering wheels to control application rate of a second product; and a last two smallest chambers each use a set of five-by-four inch metering wheels to control the application rate of third and fourth products. The torque required to turn each metering wheel is proportional to its size.

When attaching a hydraulic motor to each meter wheel, the obvious initial design would be to select identical metering motors on each metering wheel and run them in parallel; but this is wildly inefficient. The differing torques make for different pressures, but all would be supplied by the maximum needed pressure from one pump. Thus, the lower-torque systems generate lots of heat by throttling oil from the pressure needed for the highest-torque part of the system. A parallel system also requires large amounts of oil to run everything in parallel.

One could also select identical metering motors and run the motors for each chamber in series. However, if one motor is running at a high application rate and another at a low application rate, energy is wasted bypassing oil past the motors that are running at the slow rate. This system also requires high pressure to run everything in series.

One could also try sizing motors individually so that the peak pressure required for all of them at max speed is identical. But this requires unique motors for each size of chamber, and some of the sizes required don't operate well over an entire speed range of operation. Thus, this solution is both uneconomical and technically inadequate. A yet different solution is desired.

BRIEF SUMMARY OF THE INVENTION in one aspect, the invention provides a more efficient solution, from both a cost and heat/energy perspective. Continuing the above example, the invention can use two different sizes of motors (e.g., two different displacements) between the twenty-inch metering wheels and the twelve-inch metering wheels. The motor size from the twelve-inch metering wheels is then used for the four-inch metering wheels as well; but low torque required relative to the size of the twelve-inch metering wheel means that the motors for each of the four-inch metering wheels can be operated in series. This results in efficient load sharing, good efficiency, and an economical reuse of motor sizes. In a more detailed implementation, the series arrangement includes a bypass control in each of the four-inch valve banks, because the two may not require the same amount of flow. If the first four-inch valve bank in series requires less flow than the second, then the difference will flow over the bypass control. The inclusion of a load sense network can help that the bypassing flow will run at the minimum pressure needed to keep all the metering motors controlled by each valve bank running at their desired speeds.

In another aspect, the invention provides a metering system operably connected between a supply compartment of an agricultural product delivery applicator and a conveying system of the applicator. The applicator includes a bin having a first chamber to hold a first product, a second chamber to hold a second product, and a third chamber to hold a third product. The metering system comprises a hydraulic circuit, a first set of metering devices operably connecting the first chamber and the conveying system, a second set of metering devices operably connecting the second chamber and the conveying system, and a third set of metering devices operably connecting the third chamber and the conveying system. The first set of metering devices includes a first metering wheel and a first hydraulic motor operating the first metering wheel. The second set of metering devices includes a second metering wheel and a second hydraulic motor operating the second metering wheel. The second set of metering devices is hydraulically coupled in series with the first set of metering devices. The third metering device includes a third metering wheel and a third hydraulic motor operating the third metering wheel. The third set of metering devices is hydraulically coupled in parallel with the series coupled first set of metering devices and second set of metering devices. It is also envisioned that each of the first, second, and third set of metering devices includes a plurality of metering wheels and a plurality of hydraulic motors. Further, the bin can have a fourth compartment and the metering system can have a fourth set of metering devices.

In yet another aspect, the invention provides an agricultural delivery applicator having the metering system.

Numerous additional objects, aspects, and advantages of the present invention will be made apparent from the following detailed description taken together with the drawing figures.

DETAILED DESCRIPTION OF THE INVENTION

Preferred exemplary embodiments of the invention are illustrated in the accompanying drawings in which like reference numerals represent like parts throughout. In the drawings.

DETAILED DESCRIPTION OF THE INVENTION

Figure 1:
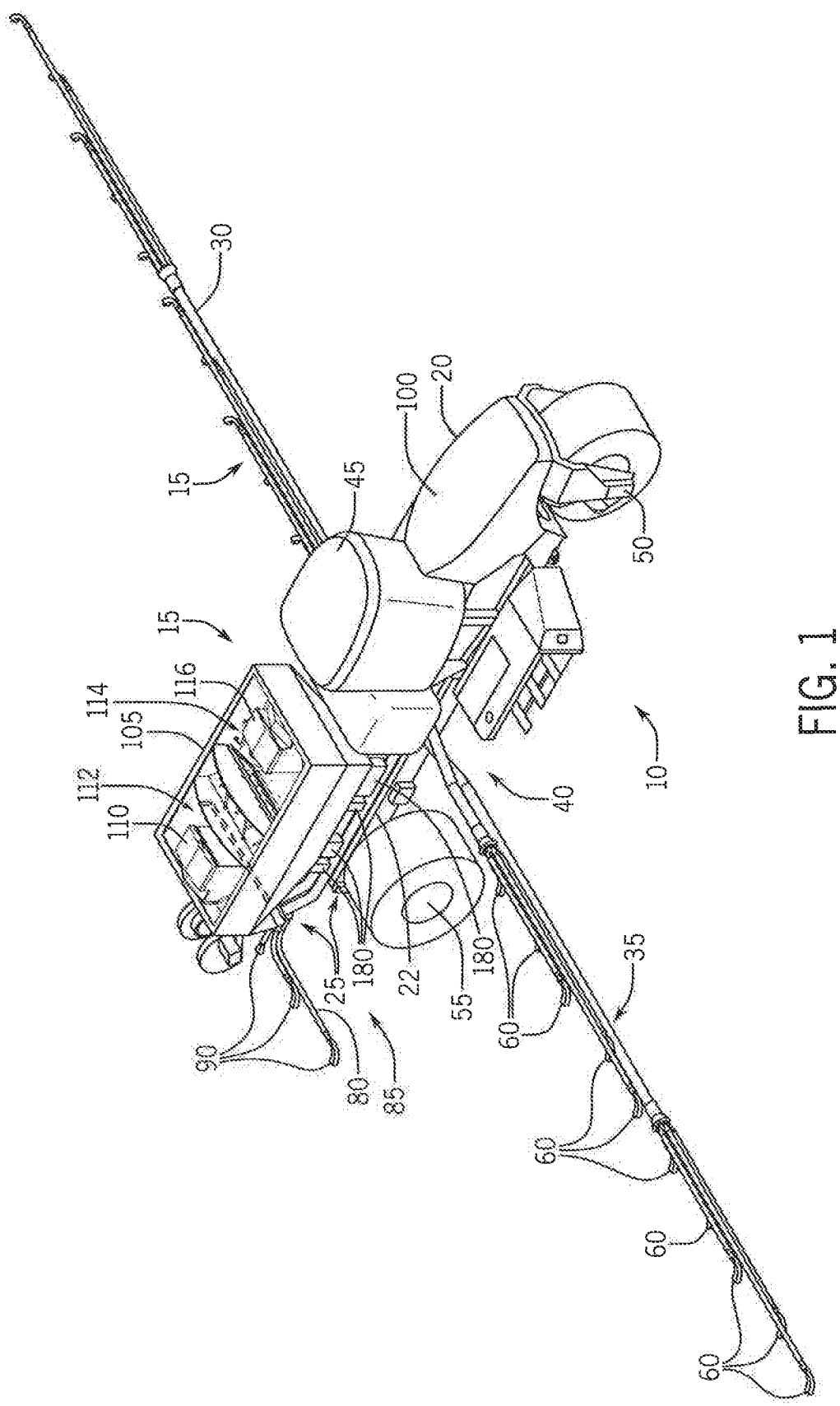
FIG. 1 is an isometric view of an agricultural application implement having a pneumatic conveying system and a metering system according to one exemplary embodiment of the invention.
Figure 2:
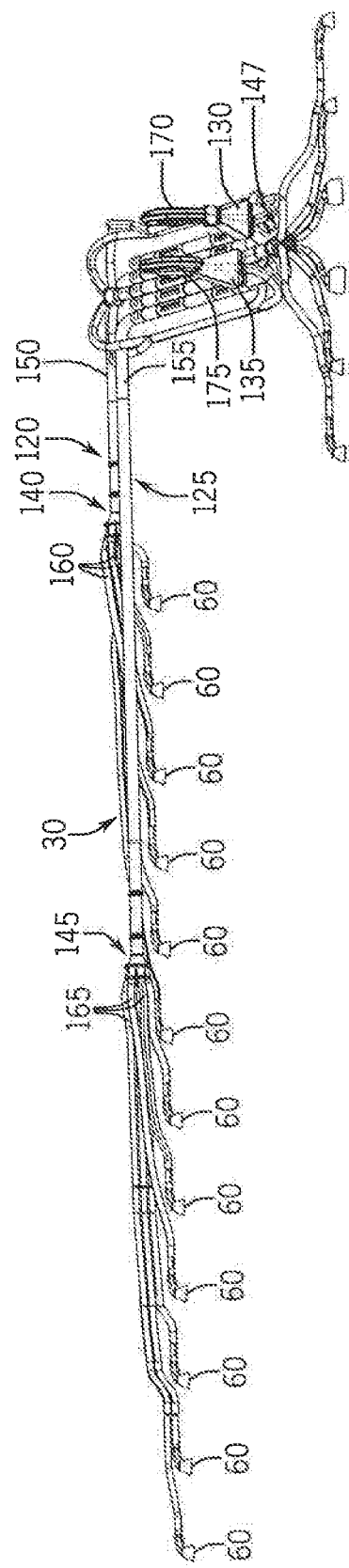
FIG. 2 is a partially broken away isometric view of a portion of the pneumatic conveying system of the implement of FIG. 1.
Figure 3:
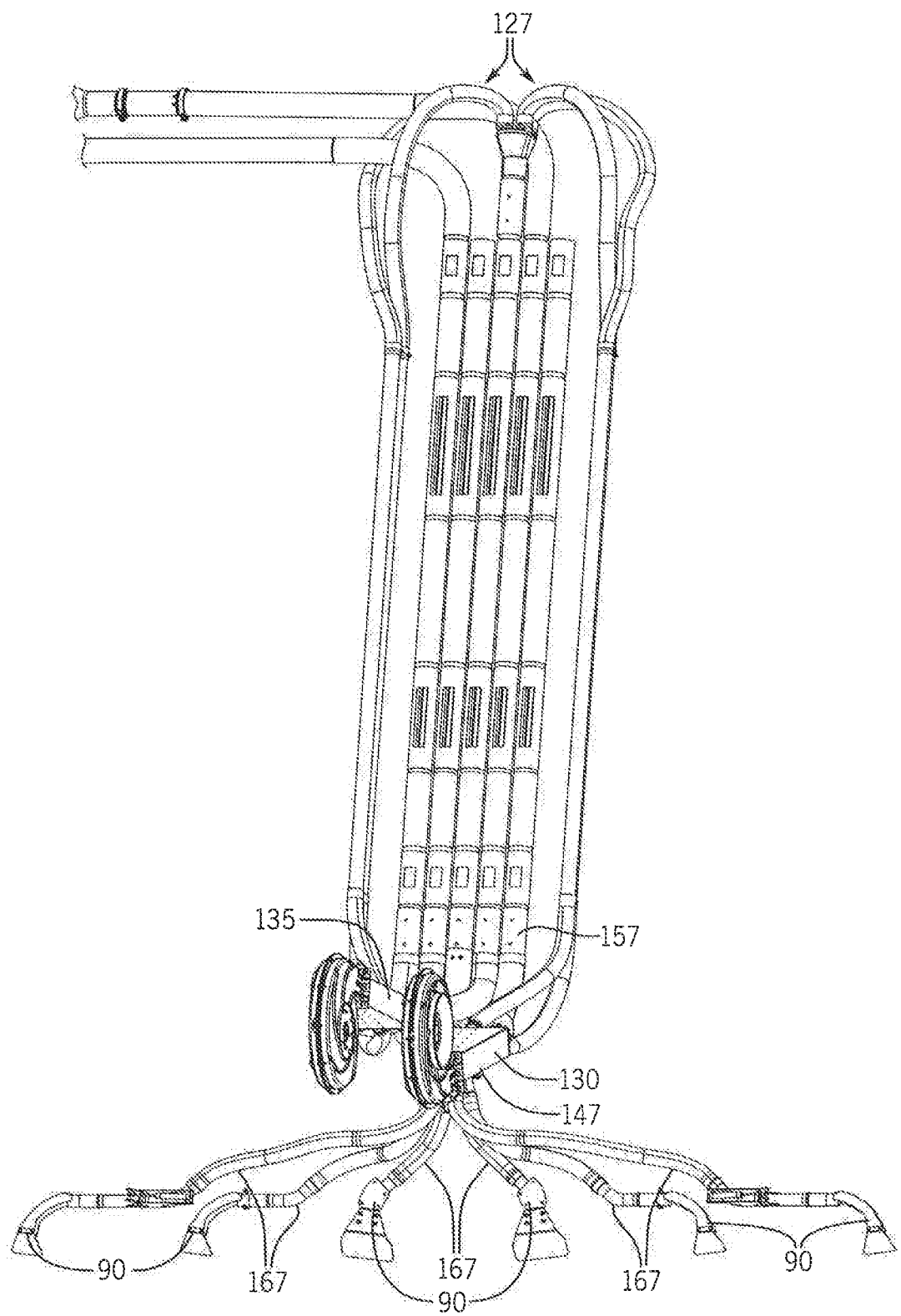
FIG. 3 is a partially broken away isometric view of a second portion of the pneumatic conveying system of the implement of FIG. 1.

An agricultural application implement 10 (or simply implement 10) incorporating aspects of the invention is shown in FIG. 1. In the exemplary embodiment shown, the implement 10 includes an agricultural product delivery applicator 15 (or simply applicator 15), which is shown as a granular fertilizer applicator. As is known in the art, the implement 10 generally includes a transport unit 20, such as a truck, tractor, or trailer, having a body or frame 22. The transport unit 20 can be formed integrally with or separately from the applicator 15. The applicator 15 includes a pneumatic conveying system 25 supported by the frame 22.

The applicator 15 includes left and right laterally extending booms 30 and 35, respectively, extending from a mid-implement location 40. Left and right are referred to herein as viewed by the operator housed in the operator cab 45. The mid-implement location 40 refers to a mounting of the booms 30 and 35 between the front and rear axles 50 and 55, respectively, of the transport unit 20. The laterally extending booms 30 and 35 include a support structure (not shown for simplicity) and can be pivoted to a stowed position close to the implement 10 for storage or transport. Each boom 30 and 35 includes a plurality of boom conduits or tubes (discussed further below) terminating at respective outboard ends in in the applicator 15. The outboard ends of the booms 30 and 35 include a spreading outlet or nozzle. In the exemplary embodiment shown, boom 35 includes twelve outlets 60.

The pneumatic conveying system 25 also includes a laterally extending offset boom 80. The offset boom 80, which may also be referred to as a secondary boom, is mounted at a rearward location 85. The rearward location 85 refers to a mount of the offset boom 80 behind the rear axis 55. The offset boom includes six rear outlets 90. The offset boom 80 in combination with the booms 30 and 35 provide complete coverage across the width of applicator 15.

The shown transport unit 20 is self-propelled by an engine in an engine compartment 100 and includes the operator cab 45. For the shown construction, a bin 105 includes compartments (or chambers) 110, 112, 114 and 116 for carrying particulate material to be distributed to and disbursed by the applicator 15. One or more of the compartments, e.g., compartments 110 and 116, can supply micro-nutrients or other materials and can include a cover, respectively. The supply of particulate material in compartments 110-116 can be replenished periodically.

Before proceeding further, some aspects of the applicator 15 can be a matter of design choice to someone skilled in the art. For example, the number, arrangement, and design of the compartments 110-116 and outlets 60 and 90 can vary. The applicator 15 is illustrative of the types of equipment on which the pneumatic conveying system 100 can be used; however, it should be understood that the pneumatic conveying system 100 may, of course, be employed in conjunction with other agricultural equipment such as tillage, seeding, or planting devices and is useful in distributing particulate material other than fertilizer.

The shown construction includes compartments 110-116 of the bin 105 being disposed above portions of the pneumatic conveying system 25. FIG. 2 shows a portion of the system 25 delivering to the right laterally extending boom 35. A portion of the pneumatic conveying system 25 delivering to the left laterally extending boom 30 is similar to, but symmetrically opposite from, the portion shown in FIG. 2, and consequently is not shown in detail. FIG. 3 shows a portion of the pneumatic conveying system 25 delivering to the offset boom 80. With reference to FIGS. 2 and 3, the system 25 includes delivery lines 120, 125, and 127 that extend from a plenum 130 and 135 at one end, and terminate at the outlets 60 and 90 at the other end. Through the delivery lines 120, 125, or 127, the fluid and the product are transported therein and are to be split by a distributor assembly 140, 145, or 147. The distributor assembly 140, 145, or 147 divides or distributes a fluid-particulate combination from a supply line 150, 155, or 157 into a number of smaller distribution lines 160, 165, or 167 that are connected to the outlets 60 and 90. Further discussion regarding various distributor assemblies can be found in US Patent Application Publication No. 2018/0343792 A1, which is incorporated herein by reference.

To collect and drive the particulate material along the delivery lines 120, 125 and 127, are one or more pressurized air flow sources. For the shown construction, blowers 170 and 175 are operably connected to the plenums 130 and 135. The air flow from the blowers 170 and 175 is directed from the blowers 170 and 175 into the plenums 130 and 135, then the supply lines 150, 155, and 157, through the distributor assemblies 140, 145, and 147, into the distribution lines 160, 165, and 167, and out the outlets 60 and 90. As the airflow passes through the supply lines 150, 155, and 157, a metering system 180 (FIG. 1) entrains product from the compartments 110, 112, 114 and/or 116 into the airflow. The airflow and entrained product continues to flow along the delivery lines 120, 125, and 127 to the outlets 60 and 90.

Referring now to FIGS. 1 and 4, the particulate contained within each of the compartments 110-116 is introduced into the airflow in the delivery lines 120, 125, and 127 via an airtight inline product metering system 180, which is formed of a number of metering devices 200 that function to meter the product flowing from the compartments 110-116 into each line.

Figure 4:
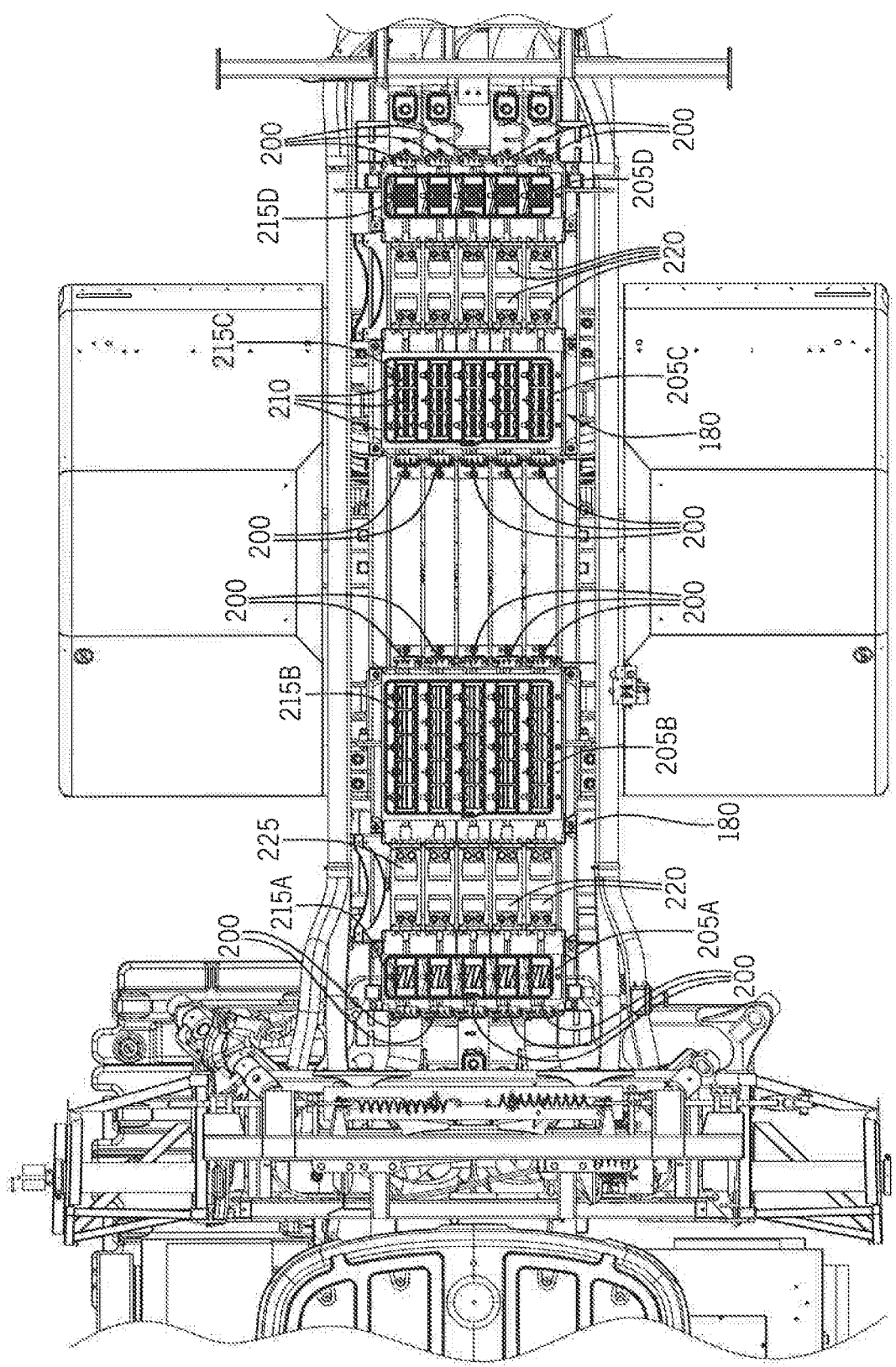
FIG. 4 is a top view of a portion of the agricultural application implement of FIG. 1 with the bin of the implement removed.

In the exemplary embodiment of FIG. 4, the metering devices 200 forming the inline metering system 180 are disposed in sets 205 located directly beneath each compartment 110-116. Each set 205 of metering devices 200 is associated with one compartment 110, 112, 114 or 116. The metering devices 200 are connected in alignment with apertures 210 formed in the metering system 180 to enable particulate material to enter the metering devices 200 and with openings in the delivery lines 120, 125, and 127 to enable the product to be dispensed from the metering devices 200 into the delivery lines 120, 125, and 127. The number of metering devices 200 forming each set 205 corresponds to the number of delivery lines 120, 125, and 127 (i.e., five delivery lines in the shown construction) in the pneumatic conveying system 25, such that the product from each compartment 110-116 can be dispensed into each delivery line utilizing the same set 205 of metering devices 200.

Each metering device 200 includes a metering wheel 215, a motor 220, and a shaft 225 connecting each metering wheel 215 to its respective motor 220. Further discussion regarding exemplary metering wheels 215 can be found in US Patent Application Publication No. 2019/0021215 A1, the content of which is incorporated herein by reference.

Figure 5:
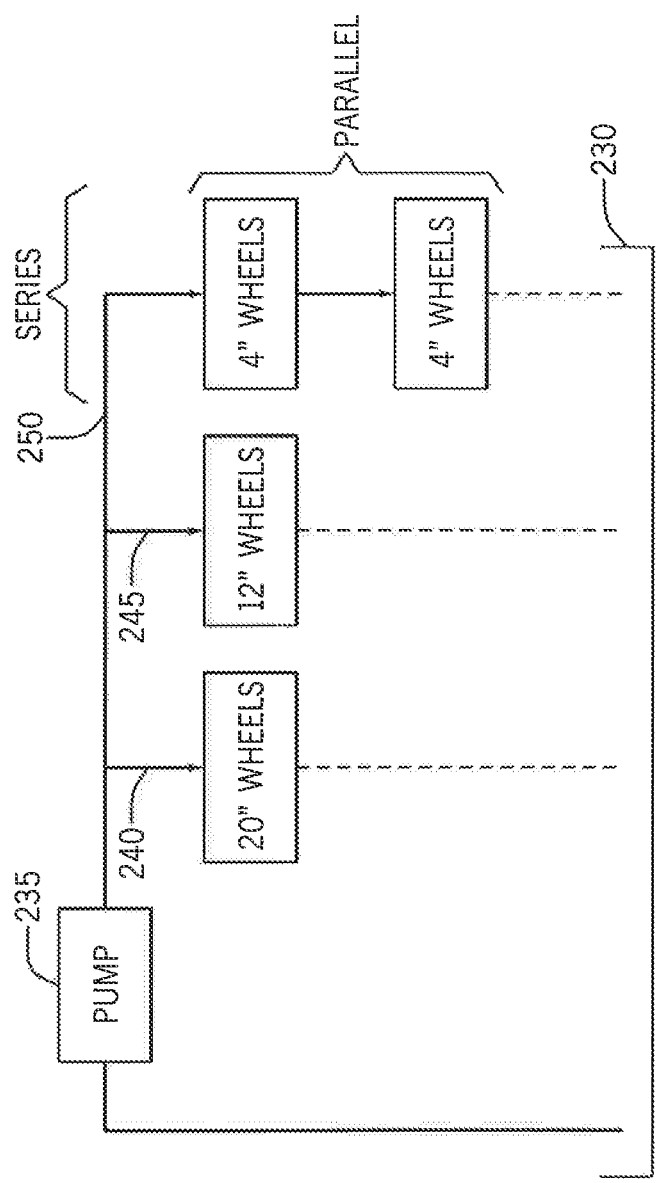
FIG. 5 is a block diagram of a hydraulic system for controlling a metering system of the implement of FIG. 1

The shown motors 220 in FIG. 4 are hydraulic motors that operate to rotate the shafts 225 and the metering wheels 215 at a desired speed to meter the flow of the particulate material through the metering devices 200 into the delivery lines 120, 125, and 127. The metering wheels 215 can be of differing sizes for the different size chambers. For example, the metering wheel 215B has a twenty-inch length for the largest-sized chamber 112, metering wheel 215C has a twelve-inch length for the intermediate-size chamber 114, and the metering wheels 215A and 215B has a four-inch length for the smallest-sized chambers 110 and 116. The provided lengths are exemplary. The motors 220 shown for the large metering wheels 215B are a first, larger motor size and the motors shown for the intermediate and small metering wheels are a second, smaller motor size. In the shown construction, all of the second, smaller motor sizes are the same size; however, it is envisioned that the smallest chambers 110 and 116 can have even a smaller motor size than the medium size chamber 114, FIG. 5 shows a block diagram representing one hydraulic arrangement for the set of metering wheels of FIG. 4. The block diagram includes a hydraulic tank 230 (or simply tank 230), and a one-directional variable hydraulic pump 235 (or simply pump 235) that receives an oil from the hydraulic tank 230. The outlet of the pump provides the oil at a pressure to three parallel branches 240, 245, and 250, respectively. The first branch 240 has a first set of hydraulic motors for the twenty-inch metering wheels 215B, the second branch 245 has a second set of hydraulic motors for the twelve-inch metering wheels 215C, and the third branch 250 has hydraulic motors, which for the shown construction are similar in size to hydraulic motors of the second set. The third branch 250 includes a first set of hydraulic motors for a first set of four inch metering wheels 215A and a second set of hydraulic motors for a second set of four inch metering wheels 215D. The return of all three parallel branches is to the hydraulic tank 230.

The shown construction uses two different sizes of motors 220 between the twenty-inch metering wheels 215B and the twelve-inch metering wheels 215C. The motor size for the twelve-inch metering wheels 215A can then used for the four-inch metering wheels 215A and 215D as well. However, the low torque required for the four-inch metering wheels 215A and 215D relative to the size of the twelve-inch metering wheels 215C allows the motors for each of the four-inch metering wheels 215A and 215D to be operated in series. This results in efficient load sharing, good efficiency, and an economical reuse of motor sizes. The shown construction also helps reduce cost, reduce oil, and reduce heat compared to other possible solutions such as solutions disclosed in the background section above. The shown construction is also modular. Any combination of the chambers (with appropriate metering wheels, motors, and valve banks) may be used with good efficiency. The configuration of a modular arrangement that mixes series and parallel architecture through the use of load sensing and bypass valves to give efficient performance at a reasonable cost, hydraulic pressure, and hydraulic flow.

Figure 6:
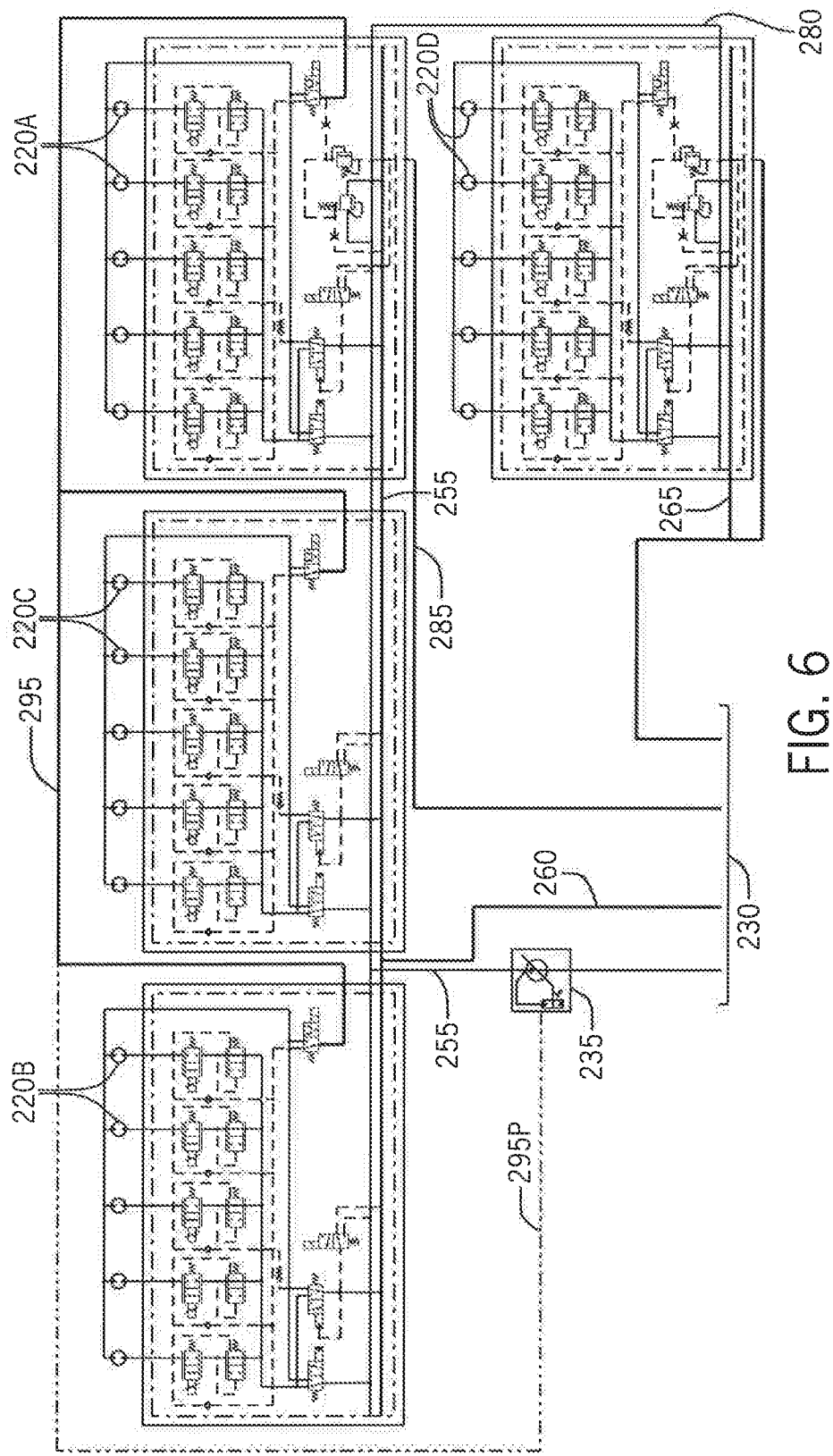
FIG. 6 is a hydraulic connectivity circuit of the hydraulic system in FIG. 5.

FIG. 6 shows an example detailed connectivity for a five-line applicator, such as shown in FIG. 1. The diagram of FIG. 6 shows a twenty-inch wheel connectivity, a twelve-inch connectivity, and two four-inch connectivities. The outlet of the pump 235 provides the oil at a pressure to the three parallel branches, the flow being represented by line 255. The first branch has the set of motors 220B for the twenty-inch metering wheels 215B, the second branch has the set of motors 220C for the twelve-inch metering wheels 215C, and the third branch has a series of two sets of motors. The series of two sets of motors includes a first set of motors 220A for a first set of four inch metering wheels 215A and a second set of motors 220D for the second set of four inch wheels 215D. The return of all three parallel branches is to the hydraulic tank 230. This is represented by lines 260 and 265. For the series branch, the outlet oil for a first set of wheels is provided to an inlet for a second set of wheels. This is represented by line 280. Lines 285 and 290 are return lines for bypass control circuits (discussed below). Line 295 provides a load sense feedback to the bypass control circuits and, possibly, the pump 235. In operation, either the load sense feedback 295 is provided back to the pump 235 (shown as phantom feedback line 295P) or an electronic controller is used to control the pump 235 through the use of a pump pressure setting (not shown in FIG. 6).

Figure 7:
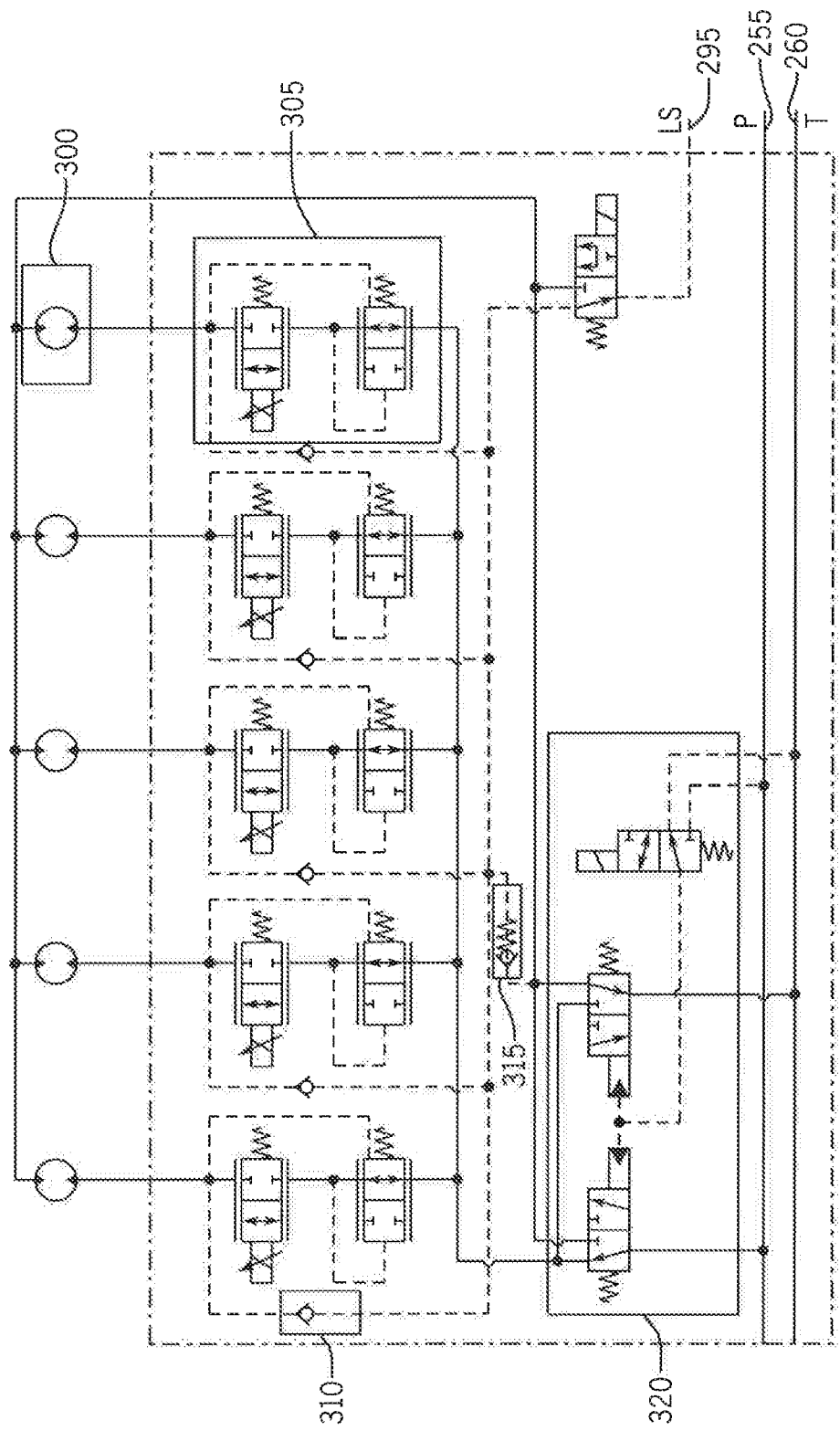
FIG. 7 is a more detailed hydraulic connectivity circuit for the twenty-inch or twelve-inch metering devices of the circuit in FIG. 6.

FIG. 7 shows a larger detailed connectivity of the twenty and twelve inch banks of FIG. 6. The metering motor 300 can be either the larger or smaller metering motor (i.e., 220B or 220C) depending on the bank. The metering motors 300 are independently controlled, and they are controlled by the pressure-compensated flow control, represented by box 305 for the motor 300. The highest pressure used in running any of the metering motors is gathered and sensed through the load sense network. The box 310 shows a forward load sensor and the box 315 shows a reverse load sensor. The sensors 310 and 315 provide feedback signals to the pressure-compensated flow control 305 and also on line 295. The load sense line 295 helps ensure the bypass sub-circuit (discussed below) operates efficiently. Whether a particular circuit (i.e., pressure-compensated flow control 305) is active and set is controlled by an electronic controller (discussed below). The box 320 provides a forward-reverse shifting sub-circuit to control the direction of flow through a motor, thereby controlling the direction of rotation for the motor. In one operation, the intention can be to predominately control the rotation of the motor 300 in a first direction, but allow for minimal reverse rotation of the motor 300 to clear out clogs in a metering device.

Figure 8:
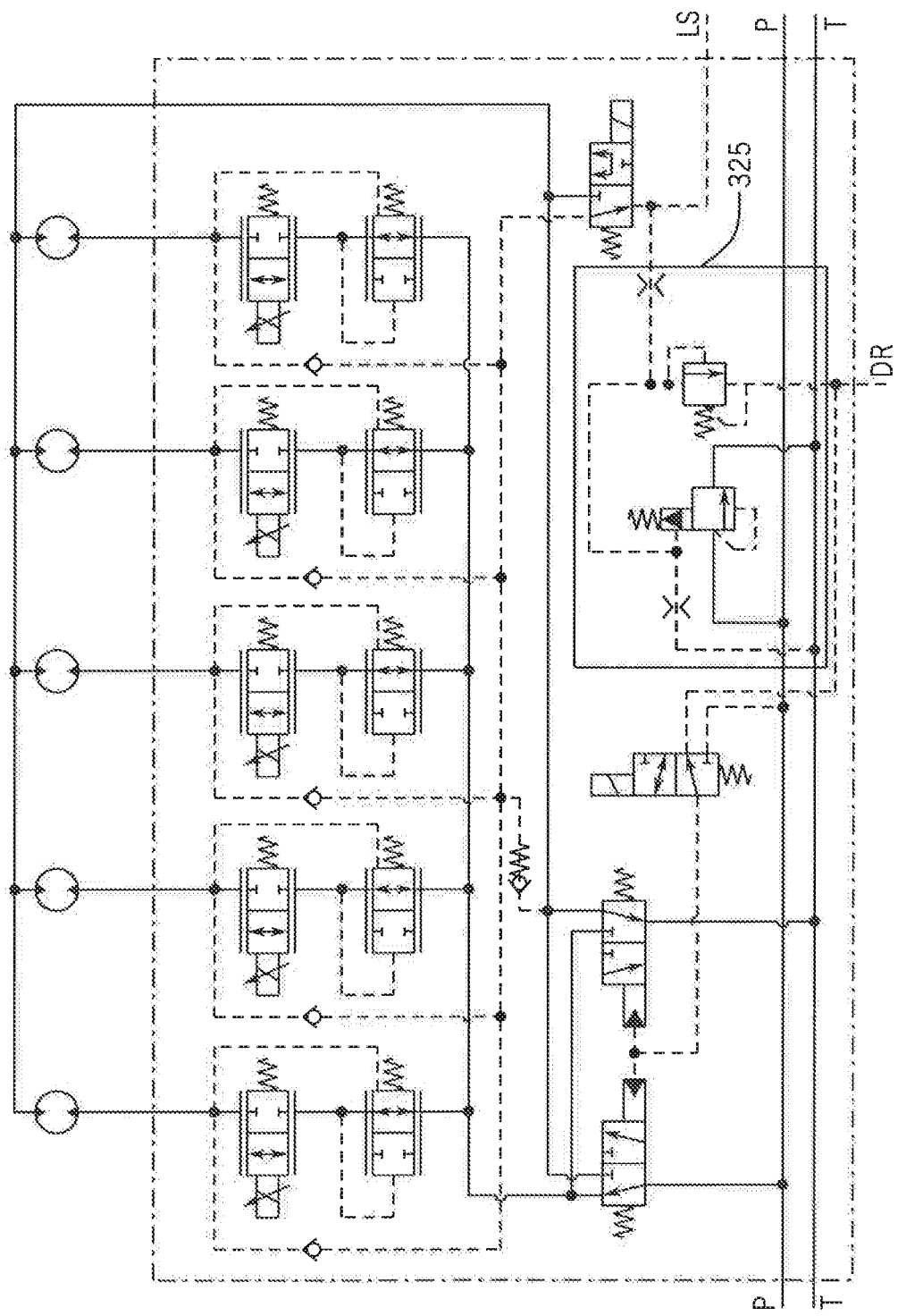
FIG. 8 is a more detailed hydraulic connectivity circuit for the four-inch metering devices of the circuit in FIG. 6.

FIG. 8 shows a larger detailed connectivity of one of the four-inch banks of FIG. 6. Similar to what was described for FIG. 7, the four-inch banks also includes metering motors, a pressure-compensated flow control for the controlling the motors, forward and reverse load centers, and a forward-reverse shifting sub-circuit. In addition, both four-inch banks includes a bypass control 325. The bypass control 325 allows for skipping or allowing little flow through the associated metering motors 300. If one valve bank in the series requires extra flow, the bypass control 325 allows extra flow without presenting issues to the "skipped" valve bank. The series arrangement includes the bypass control sub-circuit 325 in each of the 4" valve banks, because the two may not require the same amount of flow. The use of a load sense network helps that the bypassing flow will run at the minimum pressure needed to keep all the metering motors controlled by each valve bank running at their desired speeds.

Figure 9:
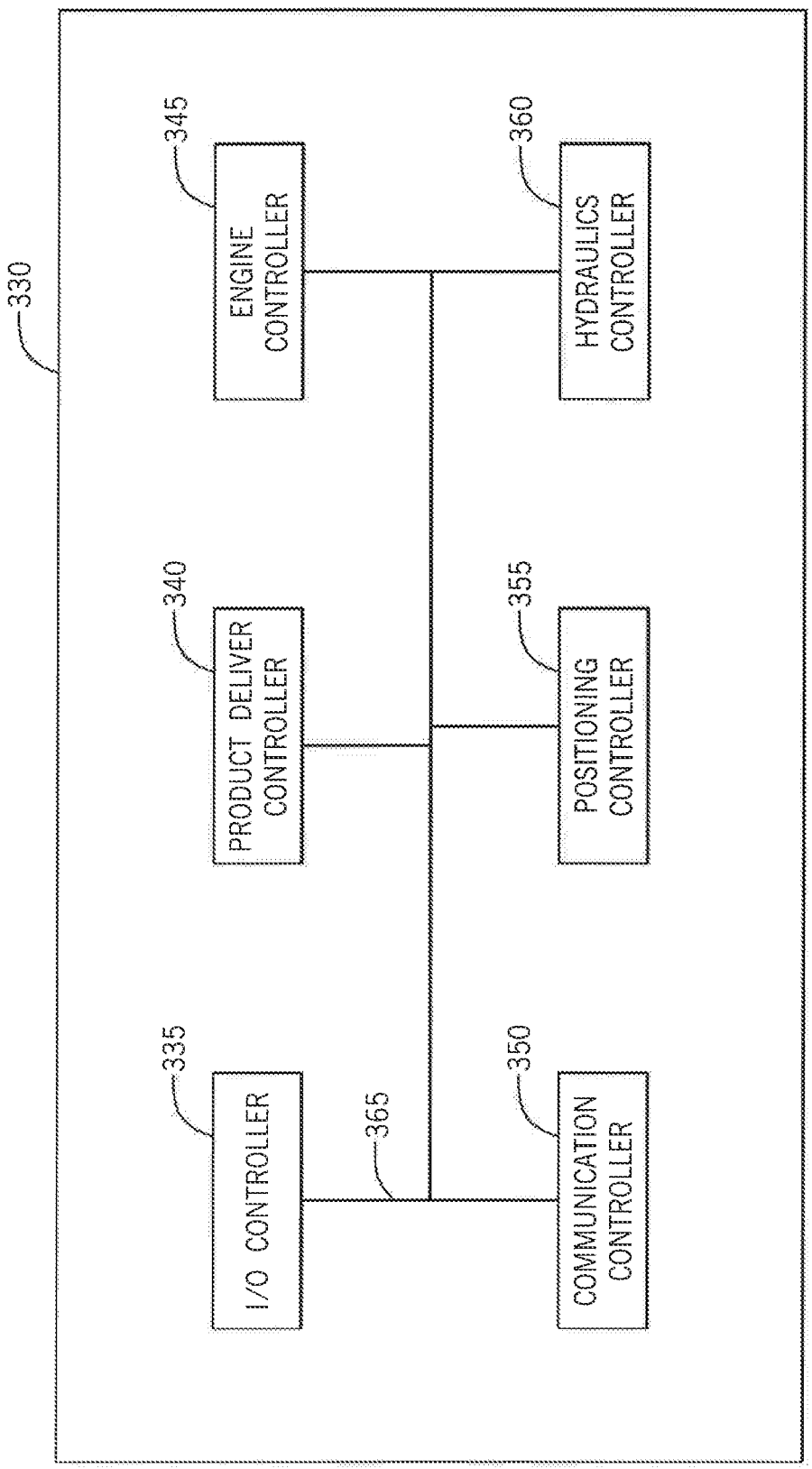
FIG. 9 is a block diagram representing an implement control system for the agricultural application implement of FIG. 1.

FIG. 9 shows a portion of an implement control system 330 capable of being used in the implement 10. The implement control system 330 includes a plurality of processor based control modules (also referred to as control units or controllers), each of which controls an aspect of the implement 10. Exemplary controllers include an input/output (I/O) controller 335, product delivery controller 340, engine controller 345, communication controller 350, positioning controller 355, and hydraulics controller 360. Other controllers known in the art may be included with the implement. Other example controllers include a transmission controller, brake controller, vehicle monitoring and status controller, etc. The controllers 335-360 are coupled together via a communication bus 335. Example functions performed by each controller include the following: the input/output (I/O) controller 335 provides outputs to and receives inputs from the operator; the product delivery controller 340 controls the delivery of product to and through the pneumatic conveying system; the engine controller 345 monitors and controls the engine, the communication controller 350 transmits and receives communication from and to the agricultural implement, the positioning controller 355 receives and/or determines position information for the agricultural implement; and the hydraulics controller 365 controls the hydraulic system of the implement including the hydraulic circuits shown in FIGS. 6-8. The other controllers referred to herein can be conventional controllers as is known in the art.

Figure 10:
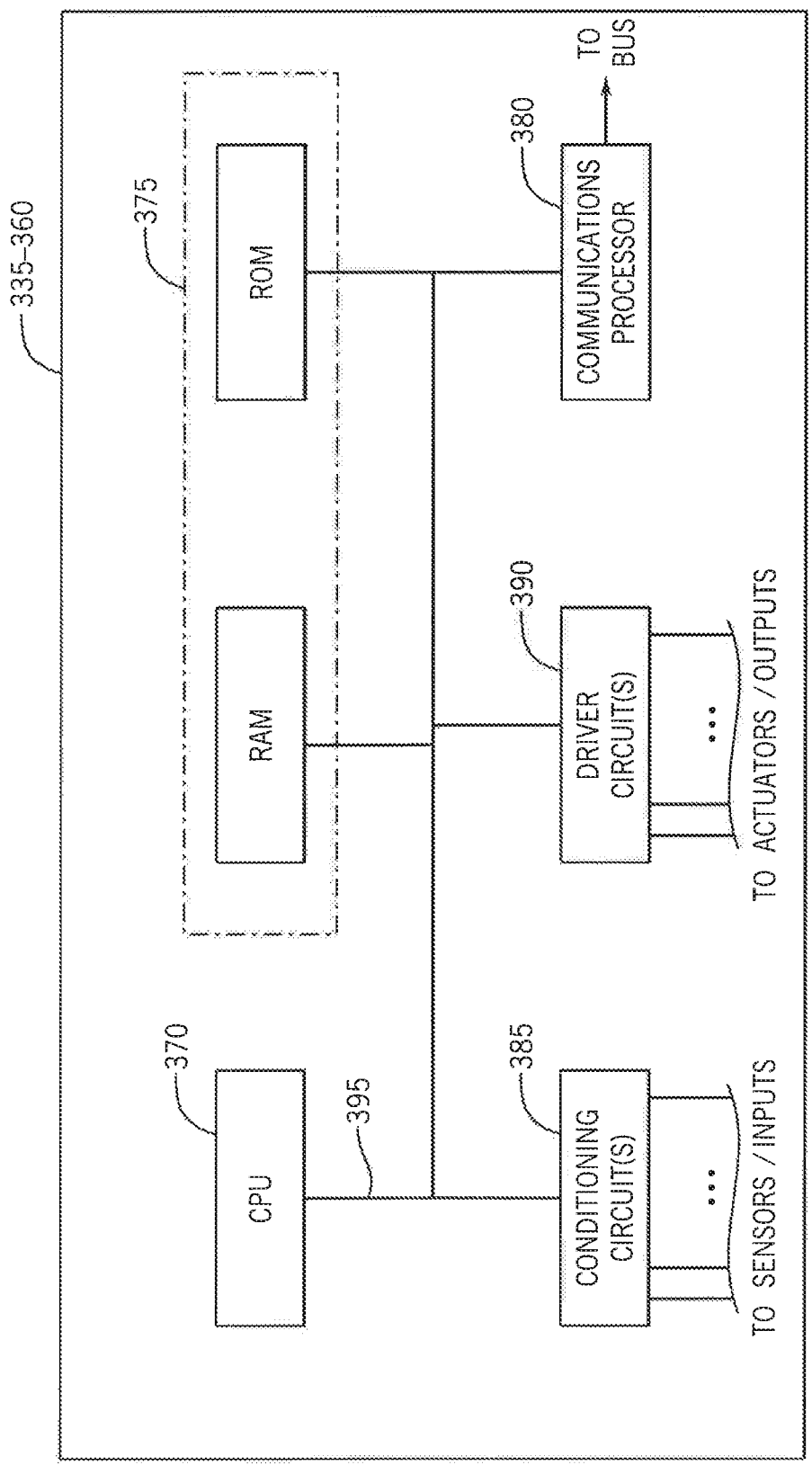
FIG. 10 is a block diagram representing an exemplary controller of those shown in FIG. 9.

FIG. 10 illustrates an exemplary controller of those shown in FIG. 9. Each controller 335-360 includes a processor 370 and memory 375, as well as a communications processor 380 configured to handle all communications over bus 365 with the other controllers 335-360 on the bus 365.

Each controller 335-360 also includes a conditioning circuit 385 that interfaces sensor signals and/or other input (e.g., external communication) to the controller 335-360. Conditioning circuit 385 filters and buffers the signals to eliminate noise, and may include sample-and-hold sub-circuits as well as analog-to-digital converters for processing analog sensor signals.

In addition, each controller 335-360 includes a driver circuit 390 that controls the application of power to actuators and/or other output (e.g., external communication). The processor 370, memory 375, conditioning circuit 385, driver circuit 390, and communications processor 380 are all coupled together by control/data/address bus 395 within each controller 335-360.

The memory 375 can include a RAM and a ROM. The RAM is used to store working variables required by the processor 370. The ROM contains programmed instructions that control the operation of the processor 370. It is envisioned that one or more elements (e.g., the processor 370 and the memory 375) can be combined as is well known in the art.

As a more detailed example, the hydraulic controller 315 receives inputs from the Product Delivery Controller as to the desired application rate of each product. The desired application rate may be a function of items such as inputs entered in the I/O Controller, ground speed and location provided by the Positioning Controller, and engine speed provided by the Engine Controller. The hydraulics controller commands the pump and hydraulic valves to power the metering motors so that the metering wheels can turn at a rate that supplies each product according to its desired application rate. The hydraulics controller also monitors the performance of the hydraulic system. If limitations of the system design or errors in the system prevent the hydraulics from delivering each product at its desired application rate, the hydraulics controller will communicate that to the Product Delivery Controller, which will notify the operator via the Communication Controller and make any other adjustments to the behavior of the machine that are necessary.

Although the best mode contemplated by the inventors of carrying out the present invention is disclosed above, practice of the above invention is not limited thereto. It will be manifest that various additions, modifications, and rearrangements of the features of the present invention may be made without deviating from the spirit and the scope of the underlying inventive concept.

What is claimed is:

1. An agricultural product delivery applicator for delivering particulate product to a field, the applicator comprising:
   a bin having a first chamber to hold a first product, a second chamber to hold a second product, and a third chamber to hold a third product;
   a pneumatic conveying system having an airflow source to provide an airflow, a delivery line operably connected to the airflow source and to the bin, and an outlet coupled to the delivery line; and
   a metering system operably connected between the supply compartment and the pneumatic conveying system, the metering system to meter product with the airflow to result in a mixed flow of airflow and product, the metering system comprising:
   a hydraulic circuit;
   a first set of metering devices operably connecting the first chamber and the delivery line, the first set of metering devices including a first metering wheel and a first hydraulic motor operating the first metering wheel;
   a second set of metering devices operably connecting the second chamber and the delivery line, the second set of metering devices including a second metering wheel and a second hydraulic motor operating the second metering wheel, the second set of metering devices being hydraulically coupled in series with the first set of metering devices; and
   a third set of metering devices operably connecting the third chamber and the delivery line, the third set of metering devices including a third metering wheel and a third hydraulic motor operating the third metering wheel, the third set of metering devices being hydraulically coupled in parallel with the series coupled first set of metering devices and second set of metering devices, wherein the bin further includes a fourth chamber to hold a fourth product, and wherein the metering system further includes a fourth set of metering devices operably connecting the fourth chamber and the delivery line, the fourth set of metering devices including a fourth metering wheel and a fourth hydraulic motor operating the fourth metering wheel, the fourth set of metering devices hydraulically coupled in parallel with the third set of metering devices and with the series coupled first set of metering devices and second set of metering devices.

2. The applicator of claim 1, wherein the first hydraulic motor, the second hydraulic motor, and the third hydraulic motor provide equal maximum displacements.

3. The applicator of claim 1, wherein the first hydraulic motor and the second hydraulic motor provide equal maximum displacements.

4. The applicator of claim 3, wherein the third hydraulic motor and the second hydraulic motor provide equal maximum displacements.

5. The applicator of claim 4, wherein the fourth hydraulic motor and the third hydraulic motor have different maximum displacements.

6. The applicator of claim 1, wherein the hydraulic circuit further includes a first bypass control associated with the first set of metering devices and a second bypass control associated with the second set of metering devices.

7. The applicator of claim 6, wherein the first bypass control allows at least a portion of a hydraulic fluid used by the second set of metering devices to bypass the first set of metering devices when the desired speed of the second hydraulic motor is greater than the first hydraulic motor, and wherein the second bypass control allows at least a portion of a hydraulic fluid used by the first set of metering devices to bypass the second set of metering devices when the desired speed of the first hydraulic motor is greater than the second hydraulic motor.

8. The applicator of claim 1, wherein the hydraulic circuit further includes a first bypass control sub-circuit associated with the first set of metering devices and a second bypass control sub-circuit associated with the second set of metering devices.

9. The applicator of claim 8, wherein the first bypass control sub-circuit allows at least a portion of a hydraulic fluid used by the second set of metering devices to bypass the first set of metering devices when the desired speed of the second hydraulic motor is greater than the first hydraulic motor, and wherein the second bypass control sub-circuit allows at least a portion of a hydraulic fluid used by the first set of metering devices to bypass the second set of metering devices when the desired speed of the first hydraulic motor is greater than the second hydraulic motor.

10. The applicator of claim 1, wherein the first set of metering devices includes a first plurality of metering wheels and a first plurality of hydraulic motors, each one of the first plurality of metering wheels is associated with a respective each one of the first plurality of hydraulic motors, the first plurality of hydraulic motors being hydraulically coupled in parallel and includes the first hydraulic motor;

wherein the second set of metering devices includes a second plurality of metering wheels and a second plurality of hydraulic motors, each one of the second plurality of metering wheels is associated with a respective each one of the second plurality of hydraulic motors, the second plurality of hydraulic motors being hydraulically coupled in parallel and includes the second hydraulic motor; and wherein the third set of metering devices includes a third plurality of metering wheels and a third plurality of hydraulic motors, each one of the third plurality of metering wheels is associated with a respective each one of the third plurality of hydraulic motors, the third plurality of hydraulic motors being hydraulically coupled in parallel and includes the third hydraulic motor.

11. A metering system operably connected between a supply compartment of an agricultural product delivery applicator and a conveying system of the applicator, the applicator include a bin having a first chamber to hold a first product, a second chamber to hold a second product, and a third chamber to hold a third product, the metering system comprising:

a hydraulic circuit;

a first set of metering devices operably connecting the first chamber and the conveying system, the first set of metering devices including a first metering wheel and a first hydraulic motor operating the first metering wheel;

a second set of metering devices operably connecting the second chamber and the conveying system, the second set of metering devices including a second metering wheel and a second hydraulic motor operating the second metering wheel, the second set of metering devices being hydraulically coupled in series with the first set of metering devices; and a third set of metering devices operably connecting the third chamber and the conveying system, the third set of metering devices including a third metering wheel and a third hydraulic motor operating the third metering wheel, the third set of metering devices being hydraulically coupled in parallel with the series coupled first set of metering devices and second set of metering devices, wherein the bin further includes a fourth chamber to hold a fourth product, and wherein the metering system further includes a fourth set of metering devices operably connecting the fourth chamber and the conveying system, the fourth set of metering devices including a fourth metering wheel and a fourth hydraulic motor operating the fourth metering wheel, the fourth set of metering devices hydraulically coupled in parallel with the third set of metering devices and with the series coupled first set of metering devices and second set of metering devices.

12. The metering system of claim 11, wherein the first hydraulic motor and the second hydraulic motor provide equal maximum displacements, wherein the third hydraulic motor and the second hydraulic motor provide equal maximum displacements, and wherein the fourth hydraulic motor and the third hydraulic motor have different maximum displacements.

13. The metering system of claim 12, wherein the hydraulic circuit further includes a first bypass control associated with the first set of metering devices and a second bypass control associated with the second set of metering devices.

14. The metering system of claim 13, wherein the first bypass control allows at least a portion of a hydraulic fluid used by the second set of metering devices to bypass the first set of metering devices when the desired speed of the second hydraulic motor is greater than the first hydraulic motor, and wherein the second bypass control allows at least a portion of a hydraulic fluid used by the first set of metering devices to bypass the second set of metering devices when the desired speed of the first hydraulic motor is greater than the second hydraulic motor.

15. The metering system of claim 11, wherein the hydraulic circuit further includes a first bypass control sub-circuit associated with the first set of metering devices and a second bypass control sub-circuit associated with the second set of metering devices.

16. The metering system of claim 15, wherein the first bypass control sub-circuit allows at least a portion of a hydraulic fluid used by the second set of metering devices to bypass the first set of metering devices when the desired speed of the second hydraulic motor is greater than the first hydraulic motor, and wherein the second bypass control sub-circuit allows at least a portion of a hydraulic fluid used by the first set of metering devices to bypass the second set of metering devices when the desired speed of the first hydraulic motor is greater than the second hydraulic motor.

17. The metering system of claim 11, wherein the first set of metering devices includes a first plurality of metering wheels and a first plurality of hydraulic motors, each one of the first plurality of metering wheels is associated with a respective each one of the first plurality of hydraulic motors, the first plurality of hydraulic motors being hydraulically coupled in parallel and includes the first hydraulic motor;

wherein the second set of metering devices includes a second plurality of metering wheels and a second plurality of hydraulic motors, each one of the second plurality of metering wheels is associated with a respective each one of the second plurality of hydraulic motors, the second plurality of hydraulic motors being hydraulically coupled in parallel and includes the second hydraulic motor; and wherein the third set of metering devices includes a third plurality of metering wheels and a third plurality of hydraulic motors, each one of the third plurality of metering wheels is associated with a respective each one of the third plurality of hydraulic motors, the third plurality of hydraulic motors being hydraulically coupled in parallel and includes the third hydraulic motor.

* * * * *